US009694646B2

(12) United States Patent
Takeuchi et al.

(10) Patent No.: US 9,694,646 B2
(45) Date of Patent: Jul. 4, 2017

(54) REFRIGERATION CYCLE DEVICE

(71) Applicant: DENSO CORPORATION, Kariya, Aichi-pref (JP)

(72) Inventors: Masayuki Takeuchi, Nukata-gun (JP); Takashi Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 43 days.

(21) Appl. No.: 14/430,581

(22) PCT Filed: Aug. 1, 2013

(86) PCT No.: PCT/JP2013/004668
§ 371 (c)(1),
(2) Date: Mar. 24, 2015

(87) PCT Pub. No.: WO2014/049928
PCT Pub. Date: Apr. 3, 2014

(65) Prior Publication Data
US 2015/0224849 A1 Aug. 13, 2015

(30) Foreign Application Priority Data

Sep. 25, 2012 (JP) ................. 2012-211025

(51) Int. Cl.
*F25B 39/02* (2006.01)
*B60H 1/00* (2006.01)
(Continued)

(52) U.S. Cl.
CPC ......... *B60H 1/00278* (2013.01); *B60H 1/323* (2013.01); *F25B 5/00* (2013.01);
(Continued)

(58) Field of Classification Search
CPC ...... F25B 5/02; F25B 5/00; F25B 2400/0409; F25B 2311/0662; F25B 2400/0411; F25B 2313/02321; F25B 2600/2501
See application file for complete search history.

(56) References Cited

U.S. PATENT DOCUMENTS 5,996,360 A * 12/1999 Tanaka ............... B60H 1/00907
62/159
6,092,379 A 7/2000 Nishida et al.
(Continued)

FOREIGN PATENT DOCUMENTS

JP S4939847 A 4/1974
JP H06293210 A 10/1994
(Continued)

OTHER PUBLICATIONS

Translation of WO 2012046594 A1.*
(Continued)

*Primary Examiner* — Elizabeth Martin
(74) *Attorney, Agent, or Firm* — Harness, Dickey & Pierce, P.L.C.

(57) ABSTRACT

In a refrigeration cycle device, a first evaporator for cooling a first cooling target and a second evaporator for cooling a second cooling target are arranged in parallel between a radiator and an accumulator, a first pressure reducer is arranged upstream of the first evaporator, and a mechanical expansion valve as a second pressure reducer is arranged upstream of the second evaporator. The refrigeration cycle device includes a refrigerant passage through which a portion of a refrigerant flowing out of the radiator flows while bypassing the second pressure reducer and the second evaporator, and is decompressed by a separate pressure reducer from the second pressure reducer, so as to return the refrigerant containing a liquid phase refrigerant to the accu- (Continued)

INDEPENDENT OPERATION MODE FOR BATTERY COOLING mulator, in a cooling operation mode for cooling only the second cooling target.

14 Claims, 9 Drawing Sheets

(51) Int. Cl.
    *F25B 5/00*     (2006.01)
    *F25B 6/04*     (2006.01)
    *B60H 1/32*     (2006.01)
    *H01M 10/663*     (2014.01)
    *H01M 10/625*     (2014.01)

(52) U.S. Cl.
    CPC .............. *F25B 6/04* (2013.01); *H01M 10/663* (2015.04); *B60H 2001/00307* (2013.01); *F25B 2341/0662* (2013.01); *F25B 2400/0409* (2013.01); *F25B 2600/2501* (2013.01); *F25B 2700/195* (2013.01); *F25B 2700/197* (2013.01); *F25B 2700/21163* (2013.01); *F25B 2700/21175* (2013.01); *H01M 10/625* (2015.04)

(56) References Cited

U.S. PATENT DOCUMENTS

| | | | |
|---|---|---|---|
| 2004/0079096 A1* | 4/2004 | Itoh | B60H 1/00735 62/223 |
| 2012/0241139 A1* | 9/2012 | Katoh | F28D 1/0426 165/202 |

FOREIGN PATENT DOCUMENTS

| | | |
|---|---|---|
| JP | 2000035250 A | 2/2000 |
| JP | 2002313441 A | 10/2002 |
| JP | 2005201484 A | 7/2005 |
| JP | 2008051474 A | 3/2008 |
| WO | WO 2012046594 A1 * | 4/2012 |

OTHER PUBLICATIONS

Office Action dated Apr. 28, 2015 mailed in the corresponding JP application No. 2012-211025 (with English translation).
International Search Report and Written Opinion (in Japanese with English Translation) for PCT/JP2013/004668, mailed Aug. 27, 2013; ISA/JP.

* cited by examiner

BATTERY COOLING-COOLING OPERATION MODE

INDEPENDENT OPERATION MODE FOR BATTERY COOLING

INDEPENDENT OPERATION MODE FOR COOLING

HEATING OPERATION MODE

INDEPENDENT OPERATION MODE FOR BATTERY COOLING

INDEPENDENT OPERATION MODE FOR BATTERY COOLING

REFRIGERATION CYCLE DEVICE

CROSS REFERENCE TO RELATED APPLICATIONS

This application is a U.S. National Phase Application under 35 U.S.C. 371 of International Application No. PCT/JP2013/004668 filed on Aug. 1, 2013 and published in Japanese as WO 2014/049928 A1 on Apr. 3, 2014. This application is based on and claims the benefit of priority from Japanese Patent Application 2012-211025 filed on Sep. 25, 2012. The entire disclosures of all of the above applications are incorporated herein by reference.

FIELD OF THE INVENTION

The present disclosure relates to a refrigeration cycle device capable of cooling a plurality of cooling targets.

BACKGROUND ART

Conventionally, in motor-driven vehicles such as electric vehicles and hybrid vehicles, electric power stored in a secondary battery is supplied to an electric motor through an inverter or the like so that driving force for traveling of the vehicles is output. The secondary battery represented as a lithium-ion battery or the like has an increased temperature due to Joule heat generated by taking in and out electric power during traveling, charging, or the like, but the secondary battery is deteriorated or damaged when the temperature thereof exceeds a predetermined temperature. For this reason, a cooler for allowing the secondary battery to be maintained at the predetermined temperature or less is required.

As the conventional cooler for cooling the secondary battery, a device using a vapor compression type refrigeration cycle device for cooling air blown into a vehicle interior in a vehicle air conditioning system is implemented. In the refrigeration cycle device provided with two evaporators interconnected in parallel in a receiver cycle having a receiver which separates gas and liquid of a refrigerant at an outlet of a condenser, air for the vehicle interior is cooled by one of the evaporators and the secondary battery is cooled by the other of the evaporators.

Meanwhile, in order to cope with lack of a heat source for heating in the electric vehicles and the like, an example of using an accumulator cycle as the refrigeration cycle for the vehicle air conditioning system is increased. The accumulator cycle includes an accumulator which separates gas and liquid of a suction refrigerant of a compressor, unlike the receiver cycle. Even in this case, in order to cool the secondary battery, a structure is considered in which two evaporators interconnected in parallel are provided, air is cooled by one of the evaporators and the secondary battery is cooled by the other of the evaporators.

Here, as control for efficiently operating the refrigeration cycle, superheat control (SH control) to control a degree of superheat (SH) of a refrigerant at an outlet of an evaporator is typically performed in the receiver cycle, and subcool control to control a degree of supercooling (subcool) of a refrigerant at an outlet of a condenser is typically performed in the accumulator cycle.

For this reason, in a case in which two evaporators are provided in parallel at a low-pressure side of the refrigeration cycle and pressure reducers are respectively provided upstream of the two evaporators, the receiver cycle is established even when the SH control is performed at both of the two pressure reducers, but the accumulator cycle dose not balance when the subcool control is performed at both of the two pressure reducers. That is, when one point of a refrigerant temperature state at the outlet of the condenser is controlled by the two independent pressure reducers, the refrigerant temperature state is unmistakably determined. For this reason, the subcool control may not be performed at both of the two pressure reducers in the accumulator cycle.

A refrigeration cycle device disclosed in Patent Document 1 is a device in which, in an accumulator cycle, first and second evaporators are arranged in parallel between a radiator and an accumulator, a first pressure reducer is arranged upstream of the first evaporator in a refrigerant flow direction thereof, and a second pressure reducer is arranged upstream of the second evaporator in a refrigerant flow direction thereof. The first pressure reducer is an electric expansion valve and is controlled such that a refrigerant flowing out of the radiator has a temperature within a predetermined range. In addition, the second pressure reducer is a lower-cost mechanical expansion valve compared to the electric expansion valve and is controlled (controlled in an SH manner) such that a refrigerant flowing out of the second evaporator has a degree of superheat within a predetermined range.

PRIOR ART LIST

Patent Document

[Patent Document 1]
Japanese Unexamined Patent Application Publication No. 2000-35250

SUMMARY OF INVENTION

According to the studies of the inventors of the present application, a method of cooling inside air (air in an interior) by the first evaporator and cooling the secondary battery by the second evaporator by means of the refrigeration cycle device having the same configuration as the above Patent Document 1 is considered. In this case, the subcool control is performed by using the condenser as the radiator and the electric expansion valve as the first pressure reducer. In addition, when the mechanical expansion valve as the second pressure reducer, which is controlled in an SH manner, is used, a fixed throttle may also be used in place of the electric expansion valve as the first pressure reducer. The use of at least the mechanical expansion valve as the second pressure reducer which is controlled in an SH manner enables a flow rate of refrigerant in the first and second evaporators to be properly distributed when simultaneous cooling by both of the first and second evaporators is performed.

In this case, the simultaneous cooling by both of the first and second evaporators and independent cooling by only the second evaporator may be performed, but independent cooling by only the second evaporator may not be performed. For this reason, during rapid charging of the secondary battery or the like, air conditioning of the vehicle interior is unnecessary, but it may be impossible to cope with a case of cooling only the secondary battery. The reason for this is as follows.

The refrigeration cycle device having the above configuration is originally not to perform the independent cooling by only the second evaporator. However, if an on/off valve is provided at the upstream side of the first evaporator and a refrigerant is introduced into only the second evaporator by closure of the on/off valve, the refrigerant flowing out of the second evaporator is an SH gas when the SH control is performed by the mechanical expansion valve at the upstream side of the second evaporator and a liquid phase refrigerant in the accumulator is empty since the liquid phase refrigerant is not introduced into the accumulator. In this case, since the liquid phase refrigerant is collected in a refrigerant outlet side in the condenser and a heat radiating region in the condenser is decreased, heat dissipation performance is lowered. As a result, a high-pressure side pressure of the cycle rises and the cycle fails.

For this reason, when the refrigeration cycle device having the above configuration is used, a simultaneous operation for vehicle interior cooling and secondary battery cooling and an independent operation for vehicle interior cooling may be performed, but an independent operation for secondary battery cooling may not be performed.

Although a case in which the air for the vehicle interior is cooled by the first evaporator and the secondary battery is cooled by the second evaporator is described herein, the above matters are not limited thereto. For example, the above matters may be caused when a first cooling target is cooled by the first evaporator and a second cooling target is cooled by the second evaporator. In addition, the above matters are not limited to a case in which the refrigerant is condensed by the condenser and the subcool is performed by the first pressure reducer. For example, the above matters are similarly caused when heat is radiated from the refrigerant by the radiator and the pressure and temperature of the refrigerant flowing out of the radiator are controlled to be within a predetermined range.

The present disclosure has been made in view of the above matters, and an object thereof is to provide a refrigeration cycle device having a configuration in which first and second evaporators are arranged in parallel between a radiator and an accumulator and a mechanical expansion valve is arranged upstream of the first evaporator in a refrigerant flow direction thereof, such that a cooling operation by both of the first and second evaporators, an independent cooling operation by the first evaporator, and an independent cooling operation by the second evaporator are executable.

In accordance with an aspect of the present disclosure for accomplishing the above object, a refrigeration cycle device includes a compressor, a radiator, first and second pressure reducers, first and second evaporators, an accumulator, refrigerant passages. The compressor compresses and discharges a refrigerant. The radiator radiates heat from the refrigerant discharged from the compressor. The first and second pressure reducers are connected in parallel downstream of the radiator in a refrigerant flow direction and decompress the refrigerant flowing out of the radiator. The first evaporator cools a first cooling target and evaporates the refrigerant by heat exchange between the refrigerant decompressed by the first pressure reducer and the first cooling target. The second evaporator cools a second cooling target and evaporates the refrigerant by heat exchange between the refrigerant decompressed by the second pressure reducer and the second cooling target. The accumulator separates gas and liquid of the refrigerant flowing out of the first and second evaporators, and causes a liquid phase refrigerant to be stored in the accumulator and a gas phase refrigerant to flow into the compressor. In the refrigerant passages, a portion of the refrigerant flowing out of the radiator flows while bypassing the second pressure reducer and the second evaporator and is decompressed by a pressure reducer different from the second pressure reducer, in a cooling operation mode for cooling only the second cooling target of the first and second cooling targets. The refrigerant containing the liquid phase refrigerant is returned to the accumulator. The second pressure reducer is a mechanical expansion valve, and an opening degree of the second pressure reducer is adjusted such that a degree of superheat of the refrigerant flowing out of the second evaporator is in a predetermined range.

In addition, the heat exchange between the refrigerant and the first cooling target and the heat exchange between the refrigerant and the second cooling target include are not limited to a case of direct heat exchange, a case of indirect heat exchange through a heating medium.

According to the configuration, in the cooling operation mode for cooling only the second cooling target, namely, in an independent cooling operation by the second evaporator, the liquid phase refrigerant may be returned to the accumulator by the refrigerant passage even though SH control is performed by the mechanical expansion valve as the second pressure reducer. Therefore, the liquid phase refrigerant may continue to be stored in the accumulator. For this reason, according to the present disclosure, the independent cooling operation by the second evaporator may be performed without failing of the cycle.

According to the present disclosure, a cooling operation by both of the first and second evaporators, an independent cooling operation by the first evaporator, and an independent cooling operation by the second evaporator may be performed even though the mechanical expansion valve as the second pressure reducer is used.

DESCRIPTION OF EMBODIMENTS

Figure 1:
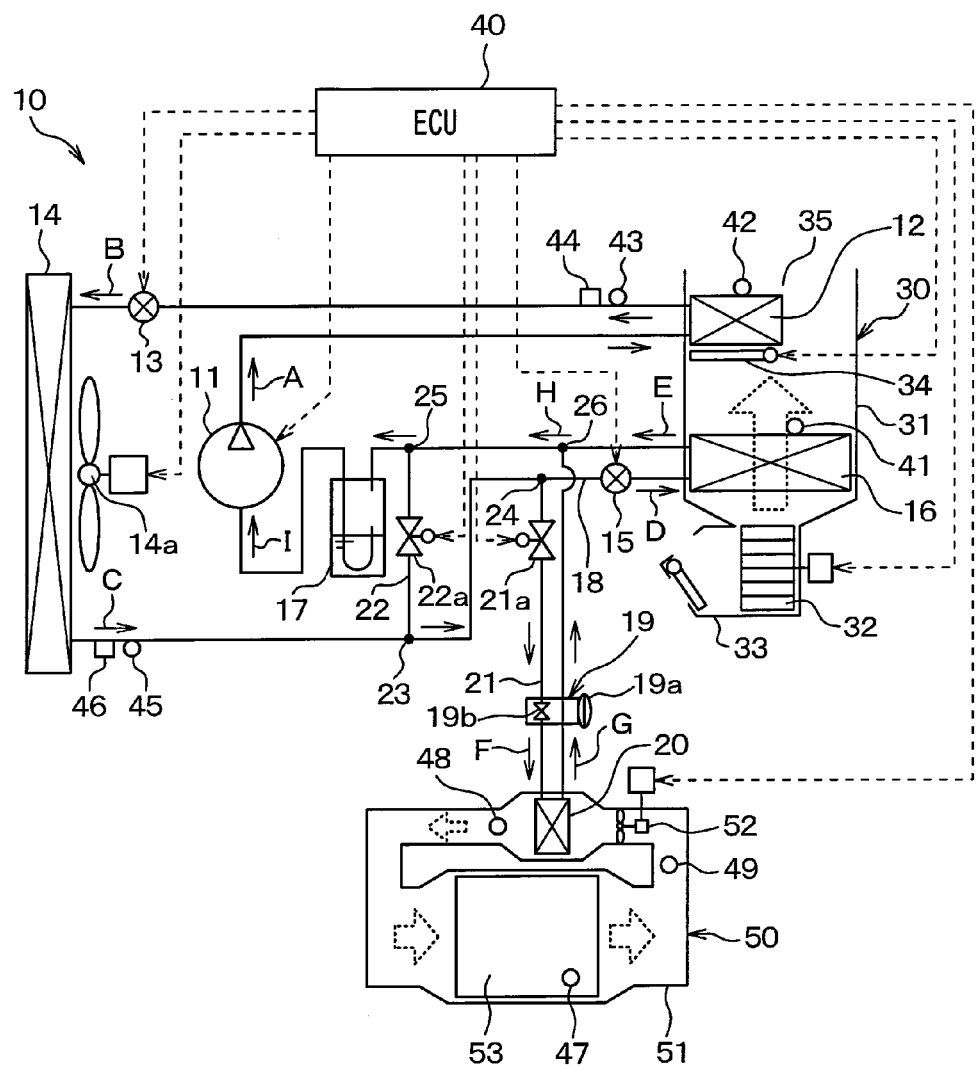
FIG. 1 is a diagram illustrating an overall configuration of a refrigerant flow in a battery cooling and cooling operation mode of a refrigeration cycle device according to a first embodiment.

Hereinafter, exemplary embodiments of the present disclosure will be described with reference to the drawings. Throughout the disclosure, like reference numerals refer to like parts throughout the various drawings and embodiments of the present disclosure.

First Embodiment

In a first embodiment, a refrigeration cycle device 10 according to the present disclosure is applied to an electric vehicle which obtains driving power for traveling of the vehicle from a traveling electric motor. Furthermore, in the electric vehicle of the embodiment, the refrigeration cycle device 10 is used to perform air conditioning (cooling and heating) of a vehicle interior and cooling of a secondary battery 53 which stores electric power supplied to the traveling electric motor, as shown in FIGS. 1 to 4.

The refrigeration cycle device 10 has a configuration in which an accumulator cycle for air conditioning is adapted to a basic cycle and a battery cooling function is added to the basic cycle. The basic cycle includes a variety of devices such as a compressor 11, an interior condenser 12, a heating expansion valve 13, an exterior heat exchanger 14, a cooling expansion valve 15, an interior evaporator 16, an accumulator 17, and electromagnetic valves 21a and 22a. The devices are connected by pipes and hoses. In the basic cycle, a battery cooling evaporator 20 is arranged in parallel with the interior evaporator 16 and a battery expansion valve 19 is arranged upstream of the battery cooling evaporator 20.

In the embodiment, the exterior heat exchanger 14, the cooling expansion valve 15, the battery expansion valve 19, the interior evaporator 16, and the battery cooling evaporator 20 are respectively used as a radiator, a first pressure reducer, a second pressure reducer, a first evaporator, and a second evaporator. In addition, air blown to the vehicle interior is a first cooling target, and a secondary battery 53 is a second cooling target.

In addition, the refrigeration cycle device 10 adopts an HFC refrigerant as a refrigerant and forms a vapor compression type subcritical refrigeration cycle in which a high-pressure side refrigerant pressure does not exceed a critical pressure. Moreover, the refrigerant is mixed with refrigerating machine oil (oil) for lubricating the compressor 11 and a portion of the refrigerating machine oil is circulated in the cycle together with the refrigerant.

Hereinafter, the refrigeration cycle device 10 will be described in detail.

The compressor 11 is arranged in a bonnet of the vehicle, and serves to introduce, compress, and then discharge a refrigerant in the refrigeration cycle device 10. The compressor 11 is configured as an electric compressor which rotatably drives a fixed displacement type compression mechanism having a fixed discharge capacity by an electric motor. An operation (rotation speed) of the electric motor of the compressor 11 is controlled by control signals output from a controller 40 to be described later.

A refrigerant inlet of the interior condenser 12 is connected to a discharge port of the compressor 11. The interior condenser 12 is a heat exchanger for heating (first utilization-side heat exchanger), which is arranged in a casing 31 forming an air passage for air in an interior air-conditioning unit 30.

A refrigerant outflow port of the interior condenser 12 is connected with an inlet of the heating expansion valve 13 which decompresses the refrigerant flowing out of the interior condenser 12 when the vehicle interior is heated by heating air.

The heating expansion valve 13 is an electric expansion valve which includes a valve configured to be capable of changing a throttle opening degree (opening degree) from full closing to full opening and an electric actuator consisting of a stepping motor for changing the opening degree of the valve. An operation of the heating expansion valve 13 is controlled by the control signals output from the controller 40. In addition, a refrigerant inlet of the exterior heat exchanger 14 is connected to a refrigerant outlet of the heating expansion valve 13.

The exterior heat exchanger 14 is disposed in the bonnet of the vehicle and exchanges heat between the refrigerant flowing therein and outside air blown from a blower fan 14a. In more detail, the exterior heat exchanger 14 functions as an evaporator which evaporates a low-pressure refrigerant to exhibit heat absorption action when the vehicle interior is heated by heating air, and functions as a radiator which condenses a high-pressure refrigerant by radiating when the vehicle interior is cooled by cooling air.

The blower fan 14a is an electric blower, an operating ratio, namely, a rotation speed (air flow rate) of which is controlled by control voltages output from the controller 40.

An outlet of the exterior heat exchanger 14 is connected in parallel with a first refrigerant passage 18 which introduces the refrigerant flowing out of the exterior heat exchanger 14 into the accumulator 17 through the cooling expansion valve 15 and the interior evaporator 16, a second refrigerant passage 21 which introduces the refrigerant flowing out of the exterior heat exchanger 14 into the accumulator 17 through the battery expansion valve 19 and the battery cooling evaporator 20, and a third refrigerant passage 22 which introduces the refrigerant flowing out of the exterior heat exchanger 14 into the accumulator 17 by bypassing the interior evaporator 16 and the battery cooling evaporator 20.

Specifically, the outlet of the exterior heat exchanger 14 is connected with a refrigerant inflow port of a first branch section 23 which branches the flow of the refrigerant flowing out of the exterior heat exchanger 14.

A refrigerant outflow port at one side of the first branch section 23 is connected with a refrigerant inflow port of a second branch section 24. In addition, a refrigerant outflow port at the other side of the first branch section 23 is connected with a refrigerant inflow port at one side of a first join section 25 through a bypass on/off valve 22a.

The refrigerant inlet of the interior evaporator 16 is connected to a refrigerant outflow port at one side of the second branch section 24 through the cooling expansion valve 15. In addition, the refrigerant inlet of the battery cooling evaporator 20 is connected to a refrigerant outflow port at the other side of the second branch section 24 through the battery expansion valve 19.

The refrigerant outlet of the interior evaporator 16 and the refrigerant outlet of the battery cooling evaporator 20 are connected with refrigerant inflow ports at one side and the other side of a second join section 26, respectively. A refrigerant outflow port of the second join section 26 is connected with a refrigerant inflow port at the other side of the first join section 25. The inlet of the accumulator 17 is connected to a refrigerant outflow port of the first join section 25.

The cooling expansion valve 15 is an electric expansion valve having the same configuration as the heating expansion valve 13, and a pressure reducer which decompresses the refrigerant flowing out of the exterior heat exchanger 14 and flowing into the interior evaporator 16 when the vehicle interior is cooled by cooling air.

The interior evaporator 16 is a heat exchanger which cools air to be blown into the interior and evaporates a refrigerant by exchanging heat between the refrigerant decompressed at the cooling expansion valve 15 and the air. The interior evaporator 16 is arranged further upstream in the air flow direction than the interior condenser 12 in the casing 31 of the interior air-conditioning unit 30.

The accumulator 17 is a gas-liquid separator 15 which separates gas and liquid of the refrigerant flowing into the inside thereof to store an excess refrigerant in the cycle. A suction side of the compressor 11 is connected to a gas phase refrigerant outlet of the accumulator 17. Accordingly, the accumulator 17 suppresses a liquid phase refrigerant from being introduced into the compressor 11 to perform a function of prevention liquid compression of the compressor 11.

In addition, the accumulator 17 supplies oil collected beneath the liquid phase refrigerant in a tank to the compressor 11 when the gas phase refrigerant is supplied to the compressor 11, thereby performing a function of returning the oil to the compressor 11.

The battery expansion valve 19 is to decompress the refrigerant flowing into the battery cooling evaporator 20 when the secondary battery 53 is cooled by cooling battery air. In the embodiment, a mechanical expansion valve in which an opening degree is adjusted so as to perform SH control, namely, so as to control a degree of superheat of the refrigerant flowing out of the battery cooling evaporator 20, is used as the battery expansion valve 19.

The mechanical expansion valve includes a temperature detection section which detects a degree of superheat of the refrigerant flowing out of the battery cooling evaporator 20, based on the temperature and pressure of the refrigerant flowing out of the battery cooling evaporator 20, and variable throttle mechanism sections 19a and 19b which adjust a throttle passage area (refrigerant flow rate) such that the degree of superheat of the refrigerant flowing out of the battery cooling evaporator 20 is in a predetermined range according to displacement of the temperature detection section.

In more detail, a valve referred to as a typical box type expansion valve is adopted as the battery expansion valve 19 in the embodiment. Such a valve is integrally equipped with a refrigerant passage section in which the refrigerant flowing out of the battery cooling evaporator 20 flows, and adjusts an opening degree of the valve body 19b, namely, an opening degree (refrigerant flow rate) of a throttle passage in such a manner that a diaphragm of the diaphragm mechanism section 19a is displaced by directly detecting the pressure and temperature of the refrigerant flowing out of the battery cooling evaporator 20.

The battery cooling evaporator 20 is arranged in a battery pack 50 forming an air passage for battery air blown toward the secondary battery 53. The battery cooling evaporator 20 is a heat exchanger which cools battery air and evaporates a refrigerant by exchanging heat between the refrigerant decompressed at the battery expansion valve 19 and the battery air. In other words, the battery cooling evaporator 20 is a heat exchanger which indirectly exchanges heat between the refrigerant and the secondary battery 53 through the battery air.

The second refrigerant passage 21 is provided with a battery on/off valve 21a. The battery on/off valve 21a is an electromagnetic valve, an on/off operation of which is controlled by the control voltages output from the controller 40. The refrigerant is switched so as to flow or so as not to flow in the second refrigerant passage 21 by opening or closing the battery on/off valve 21a. Thus, the battery on/off valve 21a forms a refrigerant passage switching section.

The third refrigerant passage 22 is provided with a bypass on/off valve 22a. The bypass on/off valve 22a is an electromagnetic valve, an on/off operation of which is controlled by the control voltages output from the controller 40. The refrigerant is switched so as to flow or so as not to flow in the third refrigerant passage 22 by opening or closing the bypass on/off valve 22a. Thus, the bypass on/off valve 22a forms a refrigerant passage switching section.

Consequently, the interior evaporator 16 and the battery cooling evaporator 20 are arranged in parallel between the outlet of the exterior heat exchanger 14 and inlet of the accumulator 17 in the embodiment. For this reason, the refrigerant flowing out of the interior evaporator 16 and the refrigerant flowing out of the battery cooling evaporator 20 are necessarily introduced into the accumulator 17.

Consequently, oil may be stably returned from the accumulator 17 to the compressor 11, even though the refrigerant flows to both of the interior evaporator 16 and the battery cooling evaporator 20 or flows to only one of them. Accordingly, the parallel arrangement of the interior evaporator 16 and the battery cooling evaporator 20 between the outlet of the exterior heat exchanger 14 and inlet of the accumulator 17 is especially effective in a case of using a refrigerant in which the oil is mixed with the liquid phase refrigerant.

Next, the interior air-conditioning unit 30 will be described. Since the interior air-conditioning unit 30 serves to blow air having a regulated temperature into the vehicle interior, the interior air-conditioning unit 30 is arranged inside a dashboard (instrument panel) at the foremost portion of the vehicle interior. Furthermore, the interior air-conditioning unit 30 is configured to accommodate a blower 32, the above-mentioned interior condenser 12 and interior evaporator 20, etc. in the casing 31 defining an external appearance of the interior air-conditioning unit.

The casing 31 is made of resin and forms an air passage in which air for the interior flows. An inside/outside air switching device 33 which switches vehicle interior air (inside air) and outside air and introduces the same into the casing 31 is arranged at the most upstream side of the air flow in the casing 31.

The inside/outside air switching device 33 is formed with an inside air introduction port through which inside air is introduced into the casing 31, and an outside air introduction port through which outside air is introduced into the casing 31. Furthermore, an inside/outside air switching door which continuously adjusts opening areas of the inside air introduction port and outside air introduction port to continuously vary a ratio of air volume between a volume of inside air and a volume of outside air is arranged within the inside/outside air switching device 33.

The blower 32 which blows air introduced through the inside/outside air switching device 33 toward the vehicle interior is arranged downstream of the inside/outside air switching device 33 in the air flow direction thereof. The blower 32 is an electric blower which drives a centrifugal multi-blade fan (sirocco fan) by an electric motor, and a rotation speed (air flow rate) of the blower 32 is controlled according to the control signals output from the controller 40.

The interior evaporator 16 and the interior condenser 12 are sequentially arranged downstream of the blower 32 in the air flow direction thereof. In other words, the interior evaporator 16 is arranged upstream of the interior condenser 12 in the air flow direction.

In addition, an air mix door 34, which adjusts a ratio of air volume allowing air after passing through the interior evaporator 16 to pass through the interior condenser 12, is arranged upstream of the interior condenser 12 in the air flow direction as well as downstream of the interior evaporator 16 in the air flow direction. The air mix door 34 is driven by a servo motor (not shown), an operation of which is controlled by the control signals output from the controller 40.

In addition, a mixing space 35 is provided downstream of the interior condenser 12 in the air flow direction. In the mixing space 35, air which exchanges heat with the refrigerant and is heated by the interior condenser 12 is mixed with air which bypasses the interior condenser 12 and is not heated.

A blowout opening portions, through which the conditioned air mixed in the mixing space 35 is blown into the vehicle interior as an air conditioning target space, is disposed at the most downstream side of the air flow in the casing 31. Specifically, the blowout opening portion includes a face blowout opening portion for blowing the conditioned air toward a passenger's upper half body in the vehicle interior, a foot blowout opening portion for blowing the conditioned air toward a passenger's feet, and a defroster blowout opening portion for blowing the conditioned air toward an inside surface of a front window glass of the vehicle (all portions being not shown).

Accordingly, the air mix door 34 adjusts a ratio of volume of air passing through the interior condenser 12, thereby allowing temperature of conditioned air mixed in the mixing space 35 to be regulated so that the temperature of the conditioned air blown from each blowout opening portion is regulated.

In addition, a face door for adjusting an opening area of the face blowout opening portion, a foot door for adjusting an opening area of the foot blowout opening portion, and a defroster door for adjusting an opening area of the defroster blowout opening portion (all doors being not shown) are respectively arranged upstream of the face blowout opening portion, the foot blowout opening portion, and the defroster blowout opening portion in the air flow direction. The face door, the foot door, and the defroster door are driven by a servo motor (not shown), an operation of which is controlled by the control signals output from the controller 40, through a link mechanism or the like.

Next, the battery pack 50 will be described. The battery pack 50 is disposed at a bottom surface of the vehicle between a trunk room in the rear of the vehicle and a rear seat, and is configured to form an air passage for circulating and blowing battery air in a metal casing 51 to which electric insulation (for instance, insulation coating) is applied and accommodate a blower 52, battery cooling evaporator 20, the secondary battery 53, etc., in the air passage.

The blower 52 is arranged upstream of the battery cooling evaporator 20 in the air flow direction and blows battery air toward the battery cooling evaporator 20. The blower 52 is an electric blower, an operating ratio, namely, a rotation speed (air flow rate) of which is controlled by the control voltages output from the controller 40. The secondary battery 53 is arranged downstream of the battery cooling evaporator 20 in the air flow direction, and an air flow downstream side of the secondary battery 53 communicates with a suction port of the blower 52.

Accordingly, when the blower 52 is operated, the battery air cooled by the battery cooling evaporator 20 is blown so that the secondary battery 53 is cooled. In addition, the battery air for cooling the secondary battery 53 is introduced into the blower 52 to be blown toward the battery cooling evaporator 20 again.

Next, an electric control portion of the embodiment will be described. The controller 40 is configured of a known microcomputer including a CPU, a ROM, and a RAM, and peripheral circuits thereof. The controller 40 controls operations of various control target devices connected to an output side thereof by executing various operations and processing, based on control programs stored in the ROM.

In addition, an input side of the controller 40 is connected with a group of various control sensors such as an inside air sensor for detecting a vehicle interior temperature, an outside air sensor for detecting an outside air temperature, a solar radiation sensor for detecting an amount of solar radiation radiated into the vehicle interior, an evaporator temperature sensor 41 for detecting a blowout air temperature (evaporator temperature) of the interior evaporator 16, a heating blowout temperature sensor 42 for detecting a blowout air temperature of the interior condenser 12, a first refrigerant temperature sensor 43 and first pressure sensor 44 for detecting respective temperature and pressure of the refrigerant flowing out of the interior condenser 12, a second refrigerant temperature sensor 45 and second pressure sensor 46 for detecting respective temperature and pressure of the refrigerant flowing out of the exterior heat exchanger 14, a battery temperature sensor 47 for directly detecting a temperature of the secondary battery 53, and first and second air temperature sensors for batteries 48 and 49 for detecting a temperature of battery air in the battery pack 50. The first and second air temperature sensors for batteries 48 and 49 are to indirectly detect a temperature of the secondary battery 53. Thus, the battery temperature sensor 47 and the first and second air temperature sensors for batteries 48 and 49 configure a battery temperature detection section for detecting a temperature of the secondary battery 53.

Furthermore, the input side of the controller 40 is connected with an operation panel (not shown) disposed in the vicinity of the dashboard at the front portion of the vehicle interior, and operation signals from various operation switches provided on the operation panel are input to the input side of the controller 40. The various operation switches provided on the operation panel include an air conditioning operation switch for requiring the vehicle interior to perform air conditioning, a vehicle interior temperature setting switch for setting a vehicle interior temperature, a switch for selecting air conditioning operation modes, etc.

The controller 40 of the embodiment is integrally formed with a control portion which controls the various control target devices connected to the output side thereof, but configurations (hardware and software) for controlling operations of the respective control target devices form a control portion which controls operations of the respective control target devices.

For example, in the controller 40, configurations (hardware and software) for controlling the operation of the compressor 11 form a refrigerant discharge capability control portion, and configurations for controlling the operations of the various devices forming the refrigerant passage switching section form a refrigerant passage switching control portion. In addition, in the controller 40, the configurations for controlling the operations of the various devices form an operation mode switching control portion, for operation in various operation modes.

Next, an operation of the refrigeration cycle device 10 of the embodiment with the above configurations will be described. As described above, the refrigeration cycle device 10 may perform air conditioning of the vehicle interior and cooling of the secondary battery 53.

Furthermore, an operation mode for air conditioning of the vehicle interior includes a cooling mode for cooling the vehicle interior and a heating mode for heating the vehicle interior. The operation modes are switched by execution of a control program which is previously stored in a storage circuit by the controller 40.

The control program reads operation signals of the operation panel and detection signals of the group of control sensors. A control routine is repeated, in which control states of the various control target devices are determined, based on the read detection signals and operation signals and control signals or control voltages are output to the various control target devices such that the determined control states are obtained.

In a case in which the operation signals of the operation panel are read, the operation mode when the air conditioning of the vehicle interior is performed is switched to a cooling mode when cooling is selected by the selection switch in a state in which the air conditioning operation switch is closed (ON), and is switched to a heating mode when heating is selected by the selection switch in a state in which the air conditioning operation switch is closed (ON).

In a case in which the detection signals of the group of control sensors are read, the battery cooling operation mode for cooling the secondary battery 53 is performed when the battery temperature is higher than a predetermined temperature and the air temperature in the battery pack is higher than a predetermined temperature.

Next, an operation of each operation mode will be described.

(a) Battery Cooling and Cooling Operation Mode

The battery cooling and cooling operation mode is an operation mode which simultaneously performs cooling of the secondary battery 53 and cooling of the vehicle interior. For example, the operation mode is performed when cooling is selected by the selection switch in a state in which the operation switch of the operation panel is closed (ON) and when the battery temperature is higher than a predetermined temperature.

In the operation mode, the controller 40 allows the heating expansion valve 13 to be a fully opened state, closes the bypass on/off valve 22a, opens the battery on/off valve 21a, and allows the cooling expansion valve 15 to be a throttle state in which decompression action is exhibited. Consequently, the refrigeration cycle device 10 switches over to a refrigerant circuit in which the refrigerant flows as indicated by the solid line arrow in FIG. 1.

With the configuration of the refrigerant circuit, the controller 40 calculates a target blowout temperature TAO as a target temperature of air blown into the vehicle interior, based on values of the read detection signals and operation signals. Furthermore, the controller 40 determines operation states of various control target devices (control signals output to various control target devices) connected to the output side of the controller 40, based on the calculated target blowout temperature TAO and the detection signals of the group of sensors.

For example, the refrigerant discharge capability of the compressor 11, namely, the control signals output to the electric motor of the compressor 11 are determined as follows. First, a target evaporator blowout temperature TEO of the interior evaporator 16 is determined based on the target blowout temperature TAO with reference to a control map previously stored in the controller 40. Then, the control signals output to the electric motor of the compressor 11 are determined such that a blowout air temperature from the interior evaporator 16 is close to the target evaporator blowout temperature TEO using a feedback control method, based on a deviation between the target evaporator blowout temperature TEO and the blowout air temperature from the interior evaporator 16 detected by the evaporator temperature sensor 41.

The control voltages output to the electric motor of the blower 32 are determined based on the target blowout temperature TAO with reference to a control map previously stored in the storage circuit.

The control signals output to the cooling expansion valve 15 are determined such that a degree of supercooling of the refrigerant flowing out of the exterior heat exchanger 14 is close to a target degree of supercooling (for instance, about 5 to 15° C.) determined such that a coefficient of performance (COP) of the cycle is determined to be about a maximum value, based on the temperature and pressure state of the refrigerant detected by the second refrigerant temperature sensor 45 and the second pressure sensor 46 (subcool control).

The control signals output to the servo motor of the air mix door 34 are determined such that the air mix door 34 closes the air passage of the interior condenser 12 and a total amount of air after passing through the interior evaporator 16 bypasses the interior condenser 12.

The control signals output to the blower 52 of the battery pack 50 are determined such that the blowing capability of the blower 52 is a predetermined blowing capability.

The control signals or the control voltages are output to the control target devices from the controller 40 such that the control states determined as described above are obtained.

Figure 5:
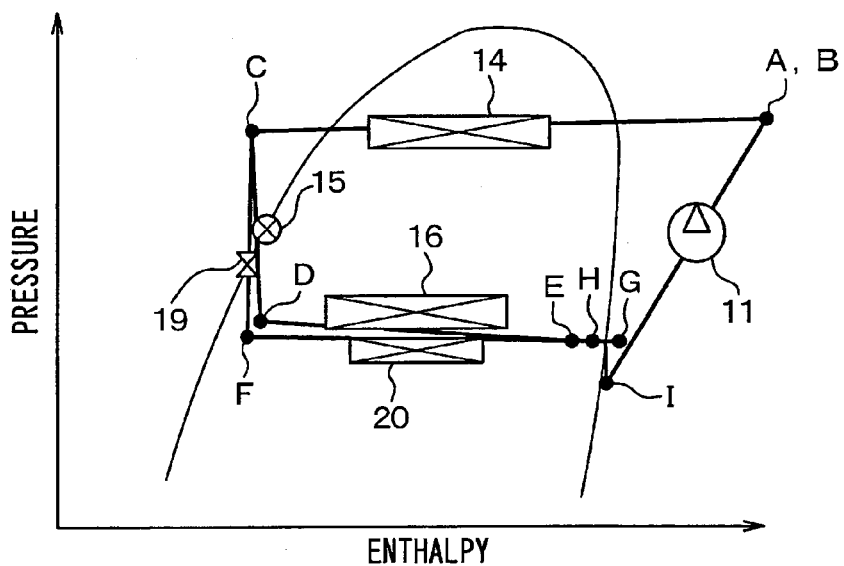
FIG. 5 is a Mollier chart illustrating a refrigerant state in the battery cooling and cooling operation mode of the refrigeration cycle device according to the first embodiment.

Accordingly, in the refrigeration cycle device 10 of the battery cooling and cooling operation mode, the refrigerant flows as shown in FIGS. 1 and 5. For convenience of description, a refrigerant state when the refrigerant flows in the interior evaporator 16 and when the refrigerant flows in the battery cooling evaporator 20 and various component devices of the refrigeration cycle device 10 are shown in the Mollier chart of FIG. 5. The same manner is also applied to FIGS. 6 to 8. In addition, points A to I of FIG. 5 show respective states of the refrigerant flowing from position A to position I in FIG. 1.

The high-pressure refrigerant discharged from the compressor 11 (point A of FIG. 5) flows into the interior condenser 12. In this case, since the air mix door 34 closes the air passage of the interior condenser 12, the refrigerant flowing into the interior condenser 12 flows out of the interior condenser 12 without substantially radiating heat to air.

The refrigerant flowing out of the interior condenser 12 flows into the exterior heat exchanger 14 (point B of FIG. 5) since the heating expansion valve 13 is in a fully opened state. The refrigerant flowing into the exterior heat exchanger 14 exchanges heat with the outside air blown from the blower fan 14a to radiate heat (from point B to point C of FIG. 5).

The refrigerant flowing out of the exterior heat exchanger 14 flows from the first branch section 23 to the second branch section 24 since the bypass on/off valve 22a is closed.

The refrigerant flowing out of the refrigerant outflow port at one side of the second branch section 24 is decompressed by the cooling expansion valve 15 (from point C to point D of FIG. 5). The refrigerant decompressed by the cooling expansion valve 15 flows into the interior evaporator 16 to be evaporated by absorbing heat from the air blown by the blower 32 (from point D to point E of FIG. 5). Thereby, the air for the interior is cooled.

The refrigerant flowing out of the interior evaporator 16 is joined with the refrigerant flowing out of the battery cooling evaporator 20 at the second join section 26 (point H of FIG. 5), and then flows into the accumulator 17 through the first join section 25.

In addition, the refrigerant flowing out of the refrigerant outflow port at the other side of the second branch section 24 is decompressed at the battery expansion valve 19 (from point C to point F of FIG. 5). The refrigerant flowing out of the battery expansion valve 19 flows into the battery cooling evaporator 20 to be evaporated by absorbing heat from the battery air blown by the blower 52 (from point F to point G of FIG. 5). In this case, since the battery cooling evaporator 20 is controlled in the SH manner by the battery expansion valve 19, a degree of superheat of the refrigerant flowing out of the battery cooling evaporator 20 is in a predetermined range. Thereby, the battery air is cooled.

In the embodiment, since the interior evaporator 16 has a greater pressure loss than the battery cooling evaporator 20, the refrigerant flowing into the interior evaporator 16 (point D of FIG. 5) has a higher pressure than the refrigerant flowing into the battery cooling evaporator 20 (point F of FIG. 5). That is, when the interior evaporator 16 and the battery cooling evaporator 20 are the same pressure loss, the refrigerant flowing into the interior evaporator 16 and the battery cooling evaporator 20 has the same pressure. When the interior evaporator 16 has a smaller pressure loss than the battery cooling evaporator 20, the refrigerant flowing into the interior evaporator 16 (point D of FIG. 5) has a lower pressure than the refrigerant flowing into the battery cooling evaporator 20.

As described above, since the interior evaporator 16 is controlled in the subcool manner by the cooling expansion valve 15 and the battery cooling evaporator is controlled in the SH manner by the battery expansion valve 19, the refrigerant having a flow ratio corresponding to control of each of the interior evaporator 16 and the battery cooling evaporator 20 flows therein.

The refrigerant flowing out of the battery cooling evaporator 20 is joined with the refrigerant flowing out of the interior evaporator 16 at the second join section 26 (point H of FIG. 5), and then flows into the accumulator 17 through the first join section 25. Then, the gas phase refrigerant separated by the accumulator 17 is introduced into the compressor 11 (point I of FIG. 5), and compressed again.

As described above, in the battery cooling and cooling operation mode, the air for the interior may be cooled by the interior evaporator 16 so as to cool the vehicle interior, and the battery air may be cooled by the battery cooling evaporator 20 so as to cool the secondary battery 53.

(b) Independent Operation Mode for Battery Cooling

The independent operation mode for battery cooling is an operation mode which independently performs cooling of the secondary battery 53 without performing air conditioning of the vehicle interior. For example, the operation mode is performed in a state in which the operation switch of the operation panel is not closed (OFF) and when the battery temperature is higher than a predetermined temperature. The operation mode corresponds to a cooling operation mode which cools only a second cooling target of first and second cooling targets.

In the operation mode, the controller 40 allows the heating expansion valve 13 to be a fully opened state, closes the bypass on/off valve 22a, opens the battery on/off valve 21a, and allows the cooling expansion valve 15 to be a throttle state, similarly to the battery cooling and cooling operation mode. Consequently, the refrigeration cycle device 10 switches over to a refrigerant circuit in which the refrigerant flows as indicated by the solid line arrow in FIG. 2. The refrigerant circuit is equal to the refrigerant circuit in the battery cooling and cooling operation mode.

With the configuration of the refrigerant circuit, the controller 40 determines operation states of the various control target devices connected to the output side of the controller 40, based on the detection signals of the group of sensors.

For example, the refrigerant discharge capability of the compressor 11 is determined according to a capability required for battery cooling, based on the detected temperatures of the battery temperature sensor 47 and the first and second air temperature sensors for batteries 48 and 49.

The control signals output to the blower 32 of the interior air-conditioning unit 30 are considered to be stopped such that the air and the refrigerant do not exchange heat in the interior evaporator 16.

In regard to the control signals output to the cooling expansion valve 15, it is determined so as to be close to a target degree of supercooling (for instance, about 5 to 15° C.), similarly to the battery cooling and cooling operation mode. In regard to the air mix door 34 and the blower 52 of the battery pack 50, it is determined similarly to the battery cooling and cooling operation mode.

Figure 2:
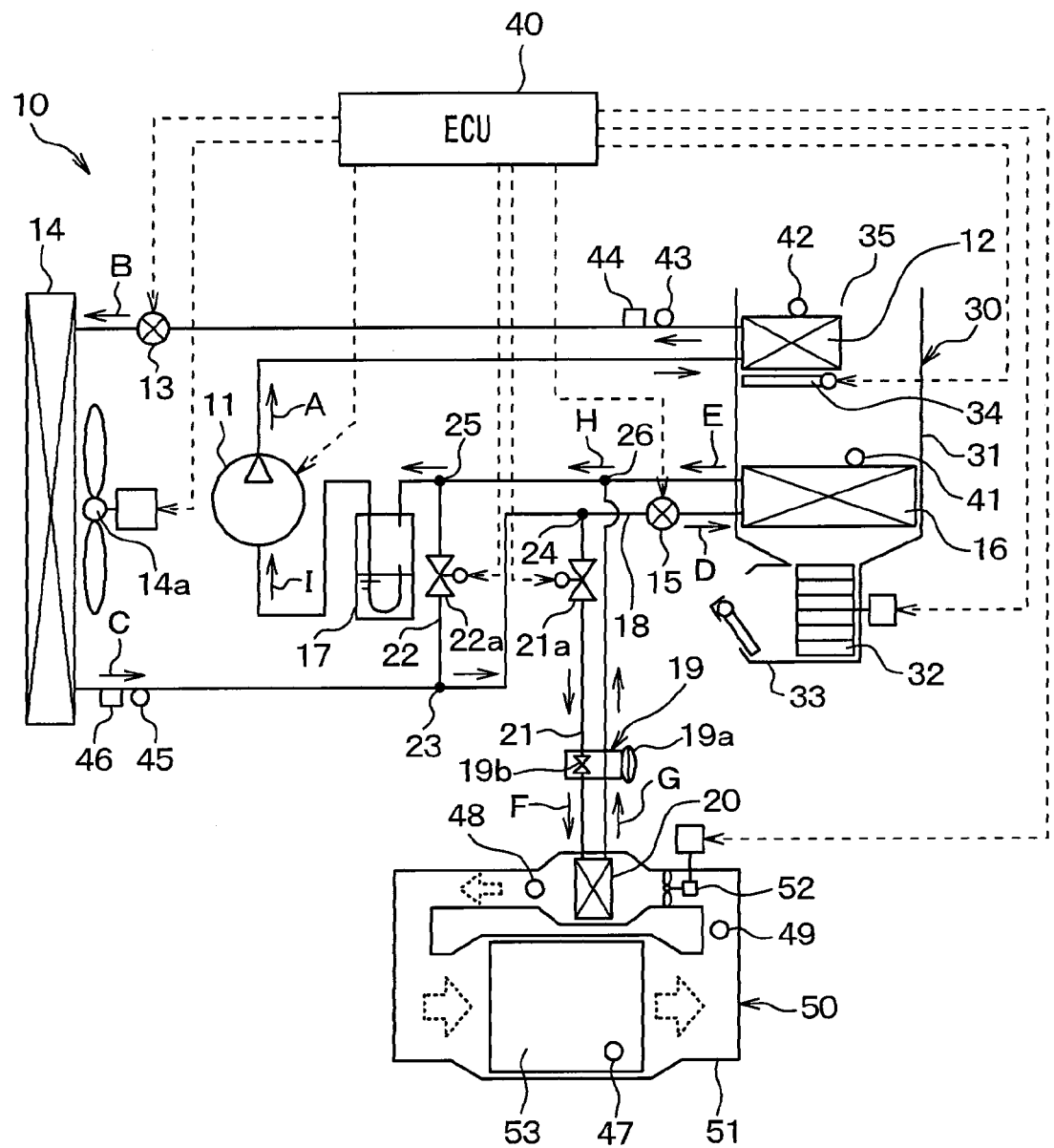
FIG. 2 is a diagram illustrating an overall configuration of a refrigerant flow in an independent cooling operation mode for battery cooling of the refrigeration cycle device according to the first embodiment.
Figure 6:
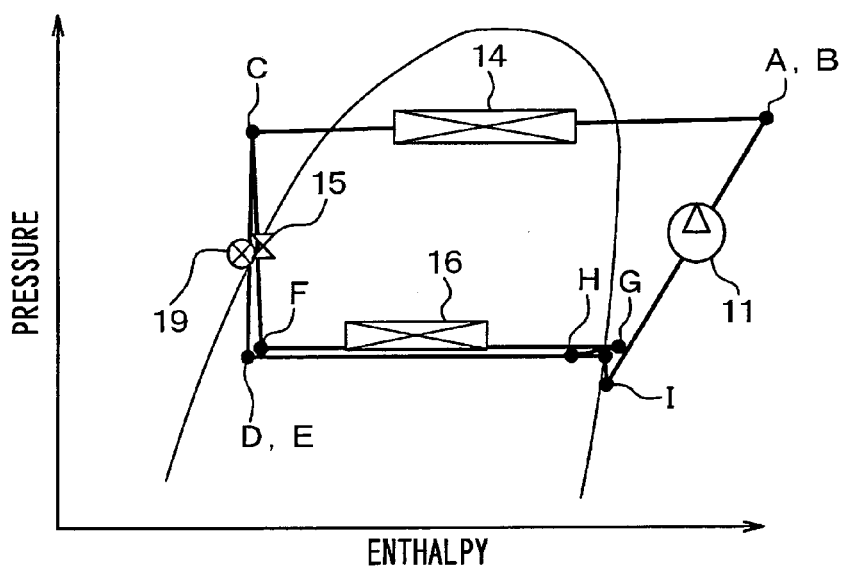
FIG. 6 is a Mollier chart illustrating a refrigerant state in the independent cooling operation mode for battery cooling of the refrigeration cycle device according to the first embodiment.

Accordingly, in the refrigeration cycle device 10 of the independent operation mode for battery cooling, the refrigerant flows as shown in FIGS. 2 and 6. In addition, points A to I of FIG. 6 show respective states of the refrigerant flowing from position A to position I in FIG. 2.

The high-pressure refrigerant discharged from the compressor 11 (point A of FIG. 6) flows into the exterior heat exchanger 14 through the interior condenser 12 and the heating expansion valve 13 (point B of FIG. 6), similarly to the battery cooling and cooling operation mode. The refrigerant flowing into the exterior heat exchanger 14 exchanges heat with the outside air to radiate heat (from point B to point C of FIG. 6).

The refrigerant flowing out of the exterior heat exchanger 14 is branched at the second branch section 24 so as to flow into the battery cooling evaporator 20 through the battery expansion valve 19 and simultaneously flow into the interior evaporator 16 through the cooling expansion valve 15, similarly to the battery cooling and cooling operation mode.

The refrigerant decompressed by the cooling expansion valve 15 (point D of FIG. 6) flows into the interior evaporator 16. In this case, in the operation mode, since the blower 32 is stopped, the refrigerant flows out of the interior evaporator 16 (point E of FIG. 6) without substantially absorbing heat from the air. For this reason, the air for the vehicle interior is not cooled, and a cooling function of blowing air to the interior evaporator 16 is not exhibited. The refrigerant flowing out of the interior evaporator 16 is in a two-layer state of gas and liquid and is a refrigerant containing the liquid phase refrigerant.

The refrigerant flowing out of the interior evaporator 16 is joined with the refrigerant flowing out of the battery cooling evaporator 20 at the second join section 26 (point H of FIG. 6), and then flows into the accumulator 17 through the first join section 25.

In addition, the refrigerant flowing out of the battery expansion valve 19 (point F of FIG. 6) flows into the battery cooling evaporator 20 to be evaporated by absorbing heat from the battery air blown by the blower 52 (from point F to point G of FIG. 6). Thereby, the battery air is cooled. In this case, since the battery cooling evaporator 20 is controlled in the SH manner by the battery expansion valve 19, the refrigerant flowing out of the battery cooling evaporator 20 is in a gas and liquid state having a degree of superheat.

In the independent operation mode for battery cooling, the interior evaporator 16 is controlled in the subcool manner by the cooling expansion valve 15, but heat exchange is not performed in the interior evaporator 16. Therefore, a flow ratio of the refrigerant flowing in the battery cooling evaporator 20 is higher than that of the battery cooling and cooling operation mode.

The refrigerant flowing out of the battery cooling evaporator 20 (point G of FIG. 6) is joined with the refrigerant flowing out of the interior evaporator 16 at the second join section 26 (point H of FIG. 6), and then flows into the accumulator 17 through the first join section 25. Thereby, the refrigerant containing the liquid phase refrigerant is supplied to the accumulator 17.

Then, the gas phase refrigerant separated by the accumulator 17 is introduced into the compressor 11 (point I of FIG. 6), and compressed again.

As described above, in the independent operation mode for battery cooling, the battery air may be cooled by the battery cooling evaporator 20 so that the secondary battery 53 is cooled.

(c) Independent Operation Mode for Cooling

The independent operation mode for cooling is an operation mode which performs cooling of the vehicle interior without performs the cooling of the secondary battery 53. For example, the operation mode is performed when cooling is selected by the selection switch in a state in which the operation switch of the operation panel is closed (ON) and when the battery temperature is lower than a predetermined temperature.

In the operation mode, the controller 40 allows the heating expansion valve 13 to be a fully opened state, closes the bypass on/off valve 22a, opens the battery on/off valve 21a, and allows the cooling expansion valve 15 to be a throttle state. Consequently, the refrigeration cycle device 10 switches over to a refrigerant circuit in which the refrigerant flows as indicated by the solid line arrow in FIG. 3.

Furthermore, the controller 40 controls operations of the compressor 11, the cooling expansion valve 15, the blower 32, and the air mix door 34, and stops the blower 52 of the battery pack 50, similarly to the battery cooling and cooling operation mode. The blower 52 may be operated similarly to the battery cooling and cooling operation mode when the secondary battery 53 is cooled only by blowing.

Figure 3:
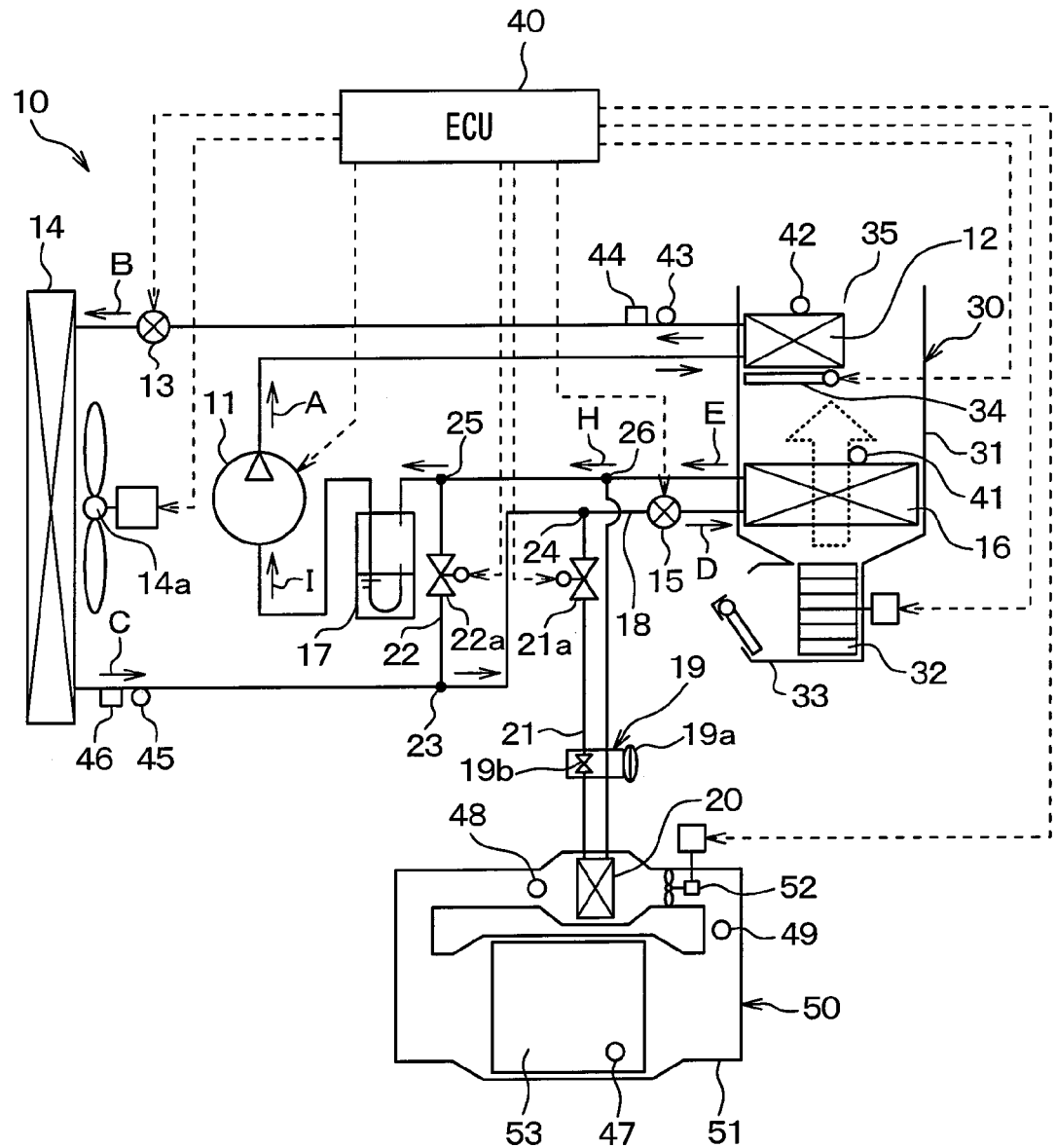
FIG. 3 is a diagram illustrating an overall configuration of a refrigerant flow in an independent cooling operation mode for cooling of the refrigeration cycle device according to the first embodiment.
Figure 7:
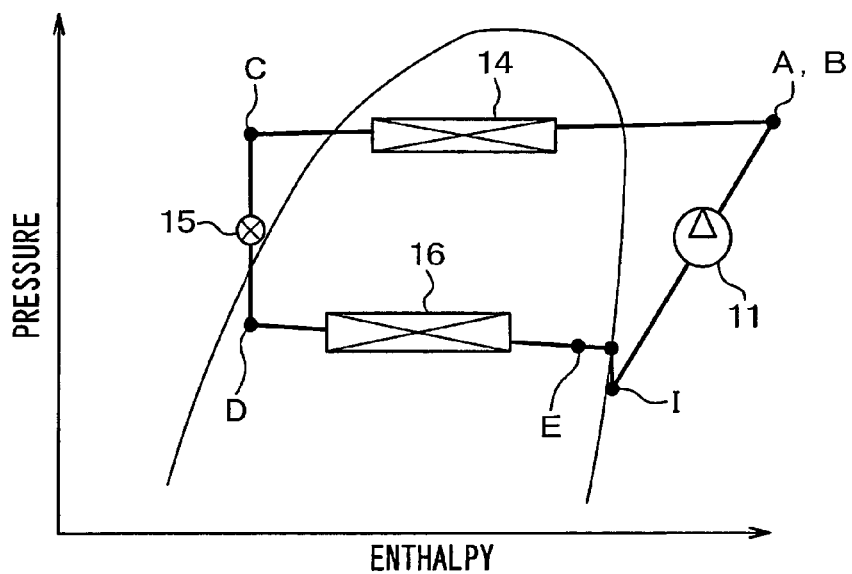
FIG. 7 is a Mollier chart illustrating a refrigerant state in the independent cooling operation mode for cooling of the refrigeration cycle device according to the first embodiment.

Accordingly, in the refrigeration cycle device 10 of the independent operation mode for cooling, the refrigerant flows as shown in FIGS. 3 and 7. In addition, points A to I of FIG. 7 show respective states of the refrigerant flowing from position A to position I in FIG. 3.

The high-pressure refrigerant discharged from the compressor 11 (point A of FIG. 7) flows into the exterior heat exchanger 14 through the interior condenser 12 and the heating expansion valve 13 (point B of FIG. 7), similarly to the battery cooling and cooling operation mode. The refrigerant flowing into the exterior heat exchanger 14 exchanges heat with the outside air to radiate heat (from point B to point C of FIG. 7).

The refrigerant flowing out of the exterior heat exchanger 14 flows into the interior evaporator 16 through the cooling expansion valve 15 since the bypass on/off valve 22a and the battery on/off valve 21a are closed.

The refrigerant decompressed by the cooling expansion valve 15 (point D of FIG. 7) flows into the interior evaporator 16 to be evaporated by absorbing heat from the air blown by the blower 32 (from point D to point E of FIG. 7). Thereby, the air blown into the vehicle interior is cooled.

The refrigerant flowing out of the interior evaporator 16 flows into the accumulator 17 through the second and first join section 26 and 25. Then, the gas phase refrigerant separated by the accumulator 17 is introduced into the compressor 11 (point I of FIG. 7), and compressed again.

As described above, in the independent operation mode for cooling, the air may be cooled by the interior evaporator 16 so that the vehicle interior is cooled.

(d) Heating Operation Mode

The heating operation mode for cooling is an operation mode which performs heating of the vehicle interior without performs the cooling of the secondary battery 53. For example, the operation mode is performed when heating is selected by the selection switch in a state in which the operation switch of the operation panel is closed (ON) and when the battery temperature is lower than a predetermined temperature.

In the operation mode, the controller 40 allows the heating expansion valve 13 to be a throttle state in which decompression action is exhibited, opens the bypass on/off valve 22a, closes the battery on/off valve 21a, and closes the cooling expansion valve 15. Consequently, the refrigeration cycle device 10 switches over to a refrigerant circuit in which the refrigerant flows as indicated by the solid line arrow in FIG. 4.

Furthermore, the controller 40 controls the blower 32 of the interior air-conditioning unit 30 and stops the blower 52 of the battery pack 50, similarly to the battery cooling and cooling operation mode. The blower 52 may be operated similarly to the battery cooling and cooling operation mode.

In addition, the refrigerant discharge capability of the compressor 11 is determined such that the blowout air temperature detected by the heating blowout temperature sensor 42 is close to a target blowout temperature TAO.

The control signals output to the heating expansion valve 13 are determined such that a degree of supercooling of the refrigerant flowing out of the interior condenser 12 is close to a target degree of supercooling (for instance, about 5 to 15° C.) determined such that a coefficient of performance (COP) of the cycle is determined to be about a maximum value, based on the temperature and pressure state of the refrigerant detected by the first refrigerant temperature sensor 43 and the first pressure sensor 44.

The control signals output to the servo motor of the air mix door 34 are determined such that the air mix door 34 fully opens the air passage of the interior condenser 12.

Figure 4:
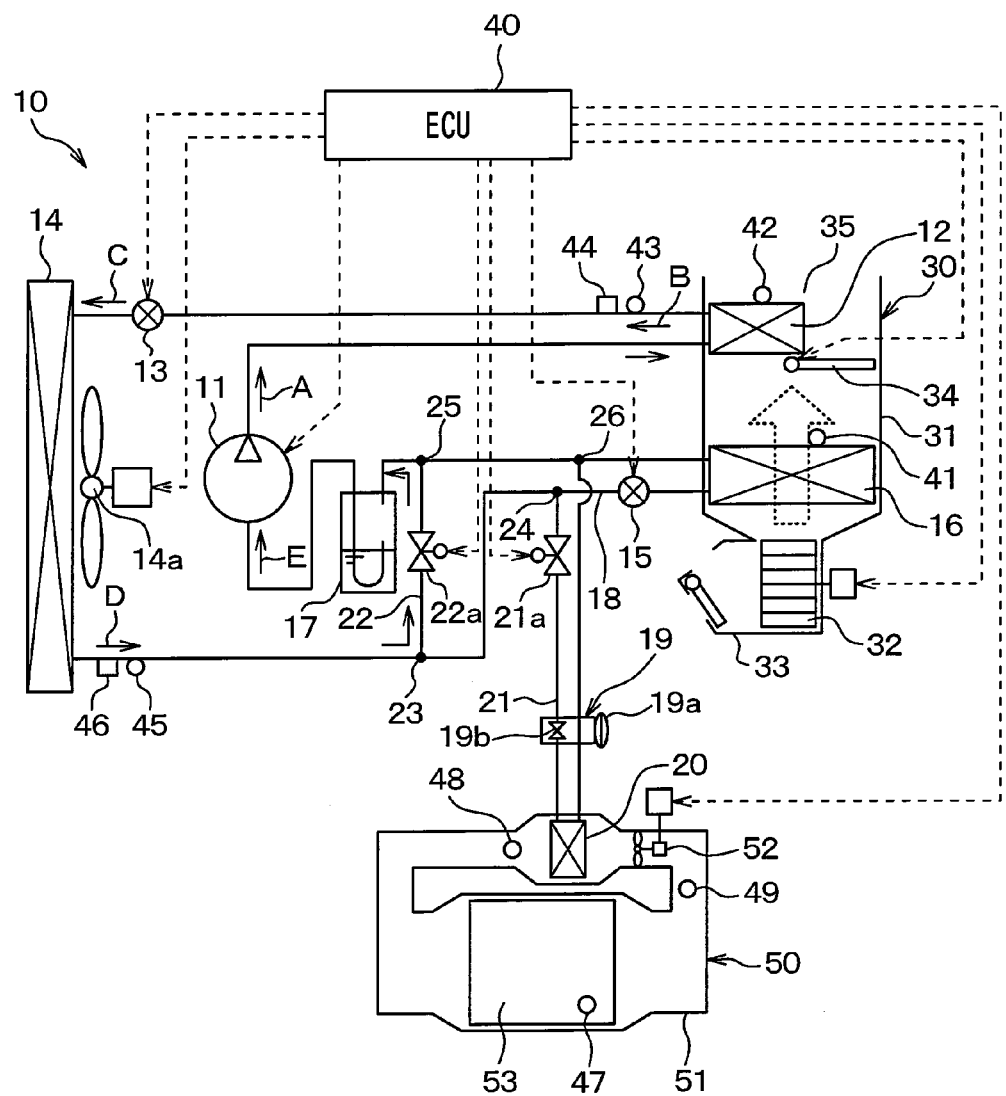
FIG. 4 is a diagram illustrating an overall configuration of a refrigerant flow in a heating operation mode of the refrigeration cycle device according to the first embodiment.
Figure 8:
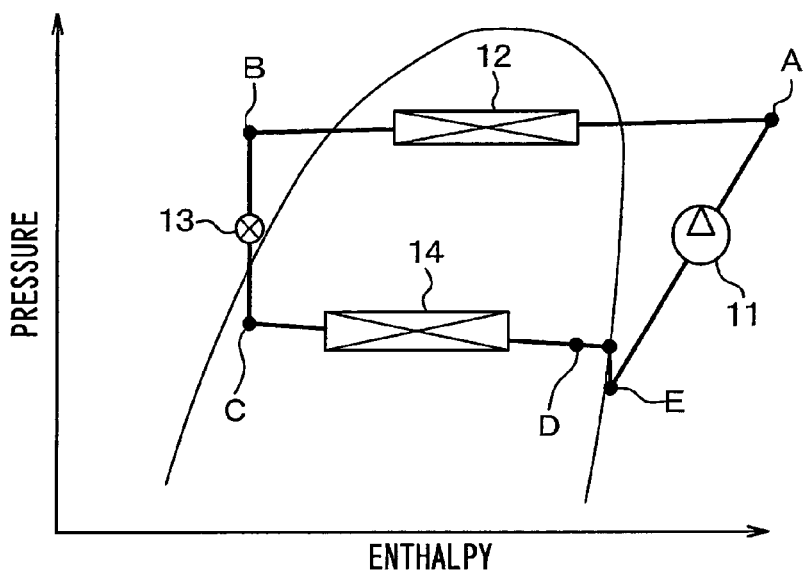
FIG. 8 is a Mollier chart illustrating a refrigerant state in the heating operation mode of the refrigeration cycle device according to the first embodiment.

Accordingly, in the refrigeration cycle device 10 of the heating operation mode, the refrigerant flows as shown in FIGS. 4 and 8. In addition, points A to E of FIG. 8 show respective states of the refrigerant flowing from position A to position E in FIG. 4.

The high-pressure refrigerant discharged from the compressor 11 (point A of FIG. 8) flows into the interior condenser 12 and exchanges heat with the air to radiate heat (from point A to point B of FIG. 8). Thereby, the air for the vehicle interior is heated.

The refrigerant flowing out of the interior condenser 12 flows into the heating expansion valve 13 to be decompressed (from point B to point C of FIG. 8). The refrigerant decompressed by the heating expansion valve 13 flows into the exterior heat exchanger 14 to be evaporated by absorbing heat from the blower fan 14a (from point C to point D of FIG. 8).

The refrigerant flowing out of the exterior heat exchanger 14 flows into the accumulator 17 through the first join section 25 since the bypass on/off valve 22a is opened and both of the battery on/off valve 21a and the cooling expansion valve 15 are closed. Then, the gas phase refrigerant separated by the accumulator 17 is introduced into the compressor 11 (point E of FIG. 8), and compressed again.

As described above, in the heating operation mode, the air may be heated by the interior condenser 12 so that the vehicle interior is heated.

Next, effects of the embodiment will be described.

In the independent operation mode for battery cooling, unlike the embodiment, when the refrigerant flows in the battery cooling evaporator 20 without flowing in the interior evaporator 16 and the SH control is performed by the battery expansion valve 19, the refrigerant flowing out of the battery cooling evaporator 20 is a gas phase refrigerant (SH gas) having a degree of superheat. Therefore, the liquid phase refrigerant may not be returned to the accumulator 17. As a result, the liquid phase refrigerant in the accumulator 17 is empty and the cycle fails.

On the other hand, the embodiment is configured such that the refrigerant flowing out of the exterior heat exchanger 14 sequentially flows through the battery expansion valve 19, the battery cooling evaporator 20, and the accumulator 17 and at the same time a portion of the refrigerant flowing out of the exterior heat exchanger 14 sequentially flows through the cooling expansion valve 15, the interior evaporator 16, and the accumulator 17. In this case, the interior evaporator 16 is in a state in which the blower 32 is stopped, namely, in a state in which the cooling function is not exhibited in the interior evaporator 16. Consequently, the liquid phase refrigerant may be returned to the accumulator 17.

For this reason, the liquid phase refrigerant may continue to be stored in the accumulator 17 even though a mechanical expansion valve performing the SH control is used as the battery expansion valve 19. Thus, the independent operation mode for battery cooling may be performed without failing of the cycle.

However, when an electric expansion valve is used as the battery expansion valve 19, the electric expansion valve is more expensive than the mechanical expansion valve and control logic (program) for controlling the electric expansion valve is necessarily established. Therefore, a control proper process in which the electric expansion valve is adjusted so as to be properly operated according to the control logic is required.

According to the embodiment, since a mechanical expansion valve may be used as the battery expansion valve 19, cost of the battery expansion valve 19 itself may be reduced and establishment of the control logic for controlling the battery expansion valve 19 may not be required so that the control proper process is significantly reduced, compared to a case in which an electric expansion valve is used as the battery expansion valve 19. Typically, the receiver cycle often uses the mechanical expansion valve. Accordingly, when other products of the receiver cycle are manufactured and the refrigeration cycle device of the embodiment is manufacture, devices are used in common. As a result, according to the embodiment, cost of the refrigeration may be reduced.

The first refrigerant passage 18 allows the refrigerant flowing out of the exterior heat exchanger 14 to be introduced into the accumulator 17 through the cooling expansion valve 15 and the interior evaporator 16. In the embodiment, a portion of the refrigerant flowing out of the exterior heat exchanger 14 flows in a state of bypassing the battery expansion valve 19 and the battery cooling evaporator 20, and is simultaneously decompressed, so that the first refrigerant passage 18 is used as a refrigerant passage through which the refrigerant containing a liquid phase refrigerant is returned to the accumulator 17.

Consequently, when the independent operation mode for battery cooling is performed, the liquid phase refrigerant may be returned to the accumulator 17 without adding a refrigerant passage for returning the refrigerant to the accumulator 17 between the exterior heat exchanger 14 and the accumulator 17.

In the embodiment, when the independent operation mode for battery cooling is performed, the opening degree of the cooling expansion valve 15 may be controlled in the subcool manner, similarly to the battery cooling and cooling operation mode and the independent operation mode for cooling.

Consequently, it may be possible to significantly reduce the control proper process with no need of changing the control logic of the cooling expansion valve 15 for each operation mode. In addition, when the control logic of the cooling expansion valve 15 differs for each operation mode, the refrigerant flow may be rapidly changed when the operation mode is changed, for example, when the cooling expansion valve 15 is changed from an opened state to a closed state. However, according to the embodiment, such a problem may be prevented.

Second Embodiment

Figure 9:
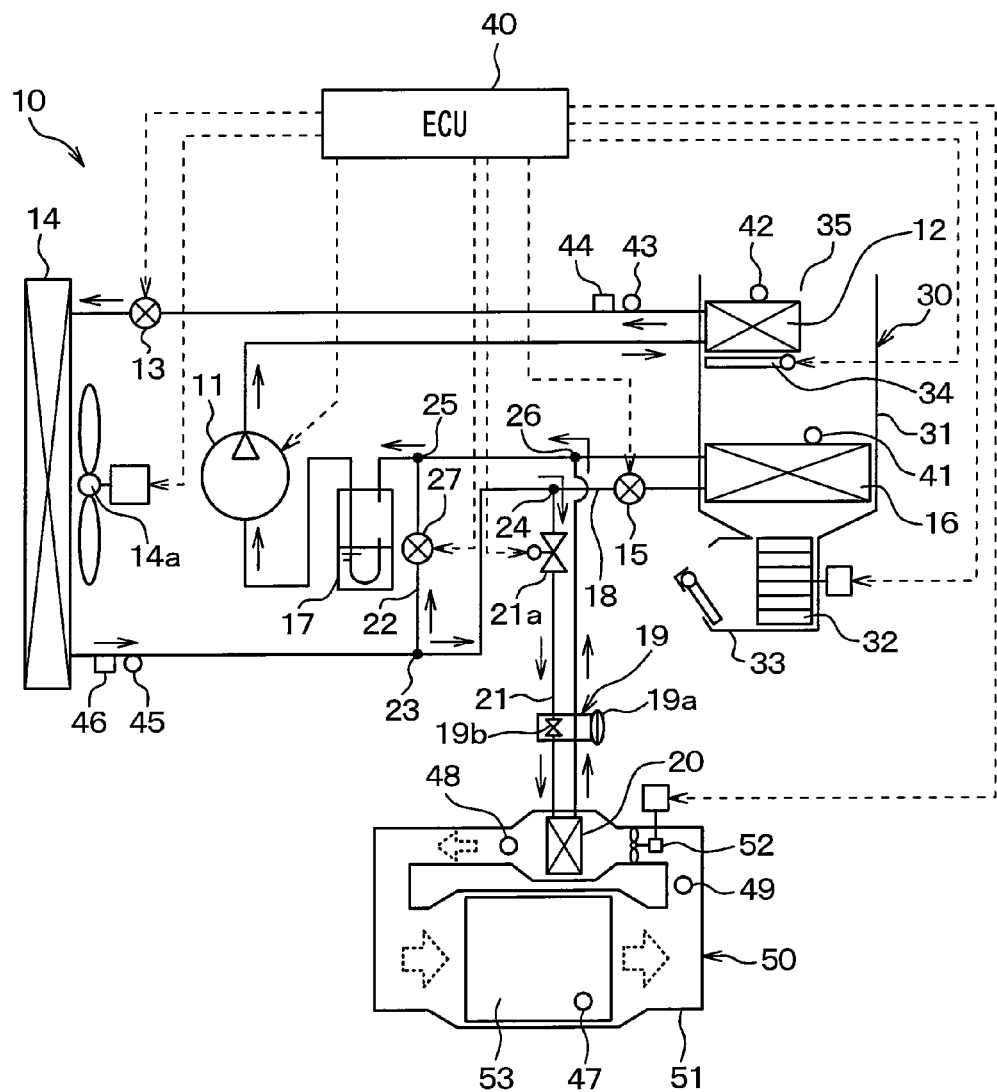
FIG. 9 is a diagram illustrating an overall configuration of a refrigerant flow in an independent cooling operation mode for battery cooling of a refrigeration cycle device according to a second embodiment.

As shown in FIG. 9, a refrigeration cycle device 10 of a second embodiment is to change the bypass on/off valve 22a provided on the third refrigerant passage 22 in the refrigeration cycle device described in the first embodiment to a bypass expansion valve 17 as a third pressure reducer.

The bypass expansion valve 27 is an electric expansion valve configured to be capable of varying an opening degree thereof from full closing to full opening. An operation of the bypass expansion valve 27 is controlled by control signals output from the controller 40.

Next, an operation during an independent battery cooling mode in the refrigeration cycle device 10 of the embodiment will be described. In addition, operations during other operation modes are equal to those of the first embodiment.

In the independent battery cooling mode, the controller 40 allows the heating expansion valve 13 to be a fully opened state, allows the bypass expansion valve 27 to be a throttle state, opens the battery on/off valve 21a, and closes the cooling expansion valve 15. Consequently, the refrigeration cycle device 10 switches over to a refrigerant circuit in which the refrigerant flows as indicated by the solid line arrow in FIG. 9.

Furthermore, the controller 40 controls operations of the compressor 11, the accumulator 17, the air mix door 34, and the blower 52 of the battery pack 50, and stops the blower 32 of the interior air-conditioning unit 30, similarly to the first embodiment.

The control signals output to the bypass expansion valve 27 are determined such that a degree of supercooling of the refrigerant flowing out of the exterior heat exchanger 14 is close to a target degree of supercooling (for instance, about 5 to 15° C.), based on the temperature and pressure state of the refrigerant detected by the second refrigerant temperature sensor 45 and the second pressure sensor 46.

Accordingly, in the independent battery cooling mode, the high-pressure refrigerant discharged from the compressor 11 flows into the exterior heat exchanger 14 through the interior condenser 12 and the heating expansion valve 13, similarly to the independent battery cooling mode of the first embodiment.

The refrigerant flowing out of the exterior heat exchanger 14 is branched at the first branch section 23 so as to flow into the battery cooling evaporator 20 through the battery expansion valve 19 and simultaneously flow into the accumulator 17 through the bypass expansion valve 27. In the embodiment, the refrigerant dues not flow in the interior evaporator 16, thereby allowing the cooling function of the interior evaporator 16 to be not exhibited.

The refrigerant flowing out of the battery cooling evaporator 20 is joined with the refrigerant flowing out of the bypass expansion valve 27 at the first join section 25, and then flows into the accumulator 17. In this case, the refrigerant decompressed by the bypass expansion valve 27 is joined with the refrigerant flowing out of the battery cooling evaporator 20 while maintaining a two-layer state of gas and liquid. Thereby, the refrigerant containing a liquid phase refrigerant is supplied to the accumulator 17.

Then, the gas phase refrigerant separated by the accumulator 17 is introduced into the compressor 11 and compressed again As described above, in the embodiment, the third refrigerant passage 22 through which the refrigerant flowing out of the exterior heat exchanger 14 bypasses the interior evaporator 16 and the battery cooling evaporator 20 to be introduced into the accumulator 17 is used as a refrigerant passage for returning the refrigerant containing a liquid phase refrigerant to the accumulator 17 during the independent battery cooling mode. Consequently, the embodiment has the same effects as the first embodiment.

Furthermore, according to the embodiment, the independent operation for battery cooling may be performed without accompanying the refrigerant flow to the interior evaporator 16. Therefore, the blower 32 of the interior air-conditioning unit 30 may also be operated. Consequently, the embodiment may perform only blowing without performing the cooling of the vehicle interior.

Third Embodiment

Figure 10:
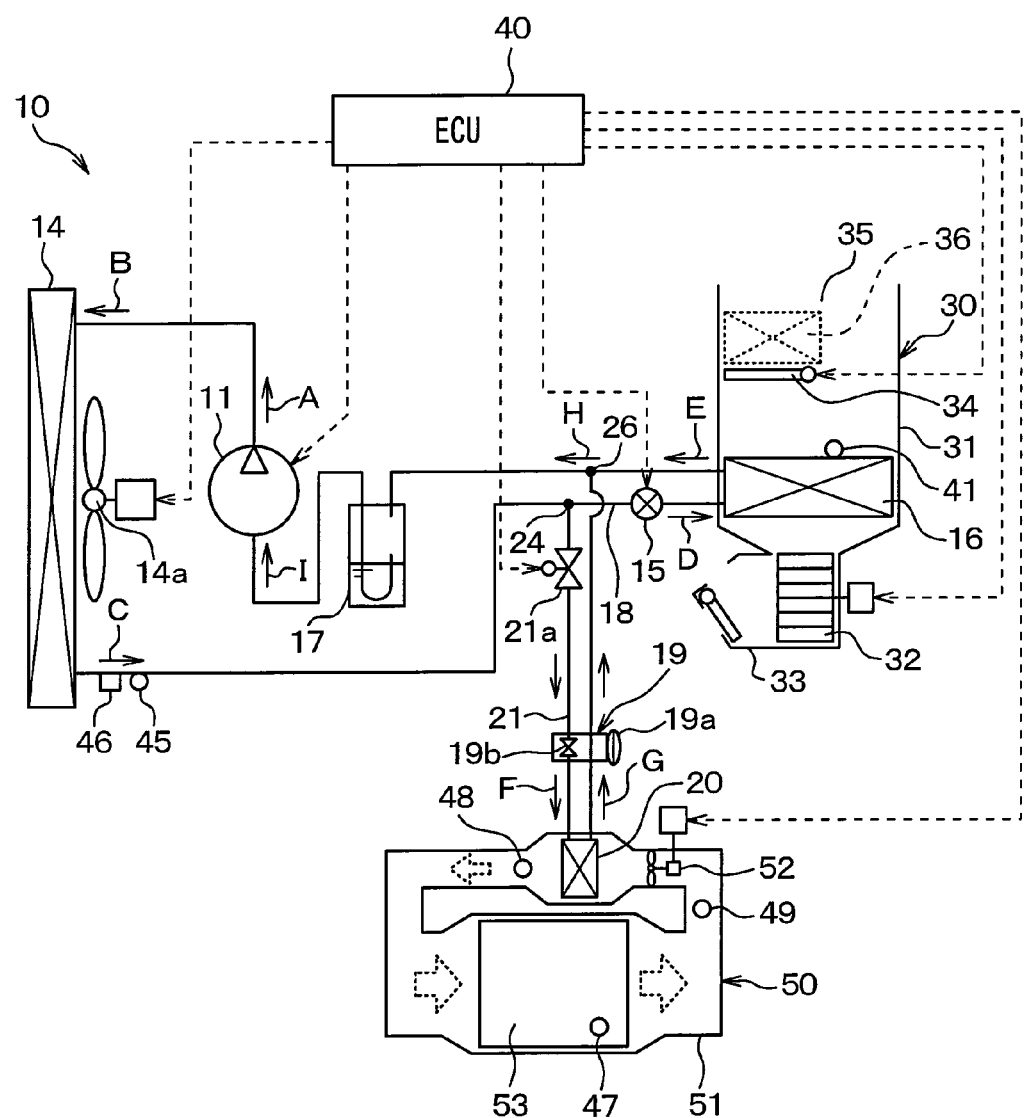
FIG. 10 is a diagram illustrating an overall configuration of a refrigerant flow in an independent cooling operation mode for battery cooling of a refrigeration cycle device according to a third embodiment.

As shown in FIG. 10, a refrigeration cycle device 10 of a third embodiment is to remove the interior condenser 12 and the heating expansion valve 13 arranged between the refrigerant outlet of the compressor 11 and the refrigerant inlet of the exterior heat exchanger 14 in the refrigeration cycle device described in the first embodiment. That is, the refrigeration cycle device 10 of the embodiment is to apply an accumulator cycle having only a cooling function as the basic cycle.

The refrigeration cycle device 10 of the embodiment is applied to an ordinary vehicle obtaining driving force for travelling the vehicle from an internal combustion engine. In the refrigeration cycle device 10 of the embodiment, a heater core 36 as a heat exchanger for heating is arranged in the casing 31 of the interior air-conditioning unit 30, in place of the interior condenser 12. The heater core 36 is to heat air using cooling water of the internal combustion engine as a heat source.

The refrigeration cycle device 10 of the embodiment is to switch various operation modes such as the battery cooling and cooling operation mode, the independent operation mode for battery cooling, and the independent operation mode for cooling described in the first embodiment. Accordingly, the embodiment may have the same effects as the first embodiment.

In the refrigeration cycle device 10 of the embodiment, a third refrigerant passage 22 through which the refrigerant flowing out of the exterior heat exchanger 14 bypasses the interior evaporator 16 and the battery cooling evaporator 20 to be introduced into the accumulator 17 and a bypass expansion valve 27 for decompressing the refrigerant flowing in the third refrigerant passage 22 are provided, similarly the second embodiment. The third refrigerant passage 22 may be used as a refrigerant passage during the independent battery cooling mode. In this case, the third refrigerant passage 22 is a refrigerant passage for returning the refrigerant.

In addition, the refrigeration cycle device 10 of the embodiment may be applied to an electric vehicle which performs heating using a heating section such as an electric heater. In this case, for example, a process of heating air using hot water heated by the heating section such as the electric heater as a heat source may be used as the above heater core 36. In addition, a heating device which directly heats air for the interior by the heating section such as the electric heater may be used in place of the above heater core 36.

Fourth Embodiment

Figure 11:
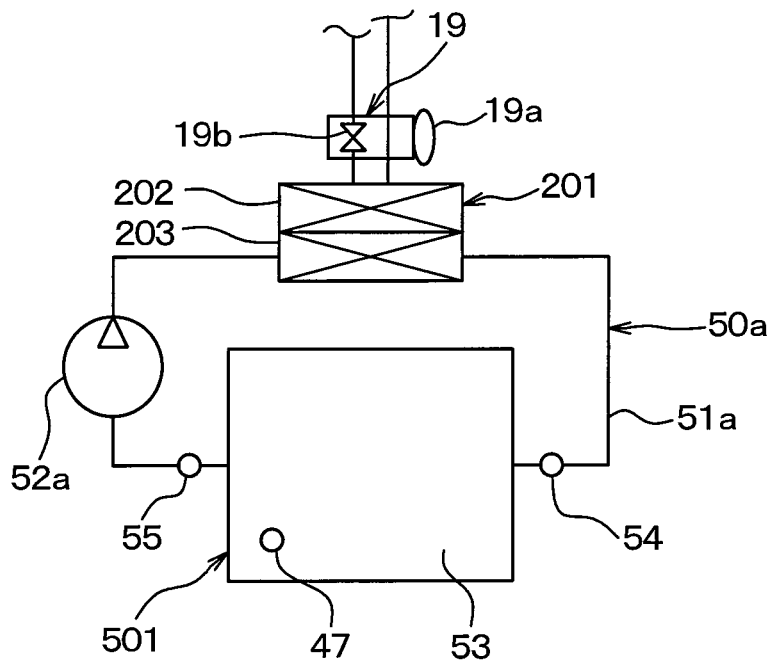
FIG. 11 is a diagram illustrating a cooling mechanism of a secondary battery according to a fourth embodiment.

Although the battery cooling evaporator 20 is a heat exchanger which exchanges heat between the battery air and the refrigerant in the first to third embodiments, a fourth embodiment uses a water-refrigerant heat exchanger 201, which exchanges heat between cooling water for cooling a battery and a refrigerant, as the battery cooling evaporator, as shown in FIG. 11. In addition, the embodiment may be applied to any of the first to third embodiments.

The water-refrigerant heat exchanger 201 configures a cooling water circuit 50a together with a water pump 52a and a battery pack 501.

The cooling water circuit 50a is a circuit which circulates cooling water for cooling the secondary battery 55, for example, an ethylene glycol solution. The cooling water circuit 50a is configured to be sequentially connected, in an annular form, to the water pump 52a, the cooling water passage formed inside or outside the secondary battery 53 in the battery pack 501, and the water-refrigerant heat exchanger 201 by a pipe 51a.

The water pump 52a is to forcibly feed cooling water, and is an electric water pump, an operation (capability for forcibly feeding cooling water) of which is controlled by control signals output from the controller 40. The operation of the water pump 52a is controlled similarly to the blower 52 in each operation mode described in the first embodiment.

The water-refrigerant heat exchanger 201 is a heat exchanger which includes a refrigerant passage 202 in which a refrigerant flows and a water passage 203 in which cooling water flows, and exchanges heat between the cooling water and the refrigerant. In other words, the water-refrigerant heat exchanger 201 is a heat exchanger which indirectly exchanges heat between the refrigerant and the secondary battery 53 through the cooling water.

In addition, the input side of the controller 40 of the embodiment is connected with an inlet side water temperature sensor 54 for detecting a water temperature of the cooling water flowing into the cooling water passage of the secondary battery 53 and an outlet side water temperature sensor 55 for detecting a water temperature of the cooling water flowing out of the cooling water passage of the secondary battery 53, in place of the first and second air temperature sensors for batteries 48 and 49. For example, the controller 40 controls the refrigerant discharge capability of the compressor 11, based on the detected temperatures of the battery temperature sensor 47 and the inlet and outlet side water temperature sensors 54 and 55 during the independent operation mode for battery cooling.

Other configuration and operation are equal to those of the first embodiment when the embodiment is applied to the first embodiment and are equal to those of the second and third embodiments when the embodiment is applied to the second and third embodiments.

Accordingly, when the refrigeration cycle device 10 of the embodiment is operated, the refrigerant decompressed by the battery expansion valve 19 flows into the refrigerant passage 202 of the water-refrigerant heat exchanger 201 and thus the cooling water passing through the water passage 203 may be cooled in the battery cooling and cooling operation mode and the independent operation mode for battery cooling. Thereby, the secondary battery 53 may be cooled.

The embodiment may have the same effects as the first embodiment even though the water-refrigerant heat exchanger 201 is used. Although the cooling water is used as a cooling liquid for cooling the secondary battery 53 in the embodiment, other cooling liquids such as oil may be used.

Fifth Embodiment

Figure 12:
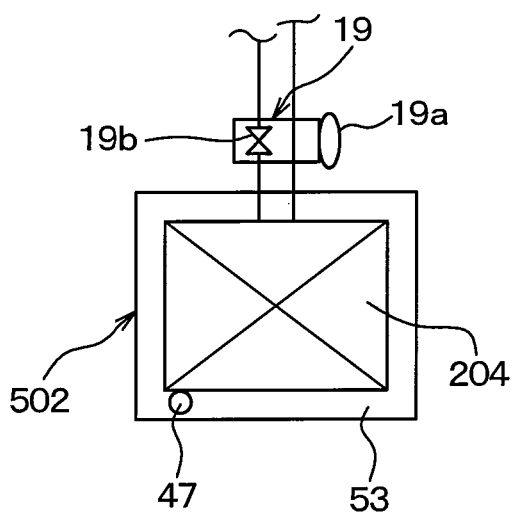
FIG. 12 is a diagram illustrating a cooling mechanism of a secondary battery according to a fifth embodiment.

As shown in FIG. 12, a fifth embodiment uses a heat exchanger 204, which directly exchanges heat between a secondary battery 53 and a refrigerant, as the battery cooling evaporator. In addition, the embodiment may be applied to any of the first to third embodiments. Other configuration and operation are equal to those of the first embodiment when the embodiment is applied to the first embodiment and are equal to those of the second and third embodiments when the embodiment is applied to the second and third embodiments.

The heat exchanger 204 is arranged in a battery pack 502 together with a secondary battery 53. The heat exchanger 204 201 is a heat exchanger which directly exchanges heat between a refrigerant and the secondary battery 53. For example, the heat exchanger 204 is configured by a refrigerant passage provided inside or outside the secondary battery 53.

Accordingly, when the refrigeration cycle device 10 of the embodiment is operated, the refrigerant decompressed by the battery expansion valve 19 flows into the heat exchanger 204 in the battery pack 502 so that the secondary battery 53 may be cooled in the battery cooling and cooling operation mode and the independent operation mode for battery cooling.

The embodiment may have the same effects as the first embodiment even though the secondary battery 53 is cooled in a direct cooling manner.

Other Embodiments (1) Although the blower 32 of the interior air-conditioning unit 30 is stopped during the independent operation mode for battery cooling so as not to exhibit the cooling function of the interior evaporator 16 in the first embodiment, other configuration may be used so as not to exhibit the cooling function of the interior evaporator 16. For example, a bypass passage (third refrigerant passage 22) in which air bypasses the interior evaporator 16 and flows and a switching section which switches over to a case in which air flows in the interior evaporator 16 and a case in which air flows in the bypass passage may be provided and the air may flow in the bypass passage by the switching section.

(2) Although the electric expansion valve is used as the heating expansion valve 13 in the first and second embodiments, a fixed throttle such as a capillary may be used in place of the electric expansion valve. In this case, a bypass path in which a refrigerant bypasses the heating expansion valve 13 and flows and an on/off valve for opening and closing the bypass path are provided. When the cooling operation mode is performed, the refrigerant bypasses the heating expansion valve 13 and flows by opening the on/off valve.

(3) Although the electric expansion valve is used as the cooling expansion valve 15 in the first to third embodiments, a fixed throttle may be used in place of the electric expansion valve. In this case, when the cooling operation mode is performed, the battery expansion valve 19 is controlled in the SH manner and thus the refrigerant of a proper amount flows in the battery cooling evaporator 20. However, in this case, since the cooling expansion valve 15 is not controlled in the subcool manner, cycle efficiency is lowered compared to the first to third embodiments. Thus, the electric expansion valve is preferably used than the fixed throttle as the cooling expansion valve 15.

In addition, the present disclosure is based on the premise that the expansion valve configured such that an opening degree thereof is adjustable and controlled in the SH manner is used as the battery expansion valve 19 without using a fixed throttle. This is because proper flow amounts of refrigerant may not be distributed with respect to the respective battery cooling evaporator 10 and interior evaporator 16 when the electric expansion valve is used as the cooling expansion valve 15 and controlled in the subcool manner and the fixed throttle is used as the battery expansion valve 19. For example, when the cooling capability required for the battery cooling evaporator 20 is low, an excessive refrigerant flows in the battery cooling evaporator 20 and thus a flow amount of refrigerant of the interior evaporator 16 is insufficient.

(4) Although a case in which the operation mode is selected by the selection switch is described in each embodiment, the controller 40 may automatically select the operation mode.

(5) Although an example in which the first cooling target is the air blown to the vehicle interior and the second cooling target is the secondary battery 53 is described in each embodiment, the first and second cooling targets are not limited thereto.

The first cooling target is air for the vehicle interior and the second cooling target may be devices mounted to the vehicle in addition to the secondary battery 53. The devices exemplify, for example, an internal combustion engine (engine), an electric motor, an inverter, etc.

Both of the first and second cooling targets may also be air for the vehicle interior. In this case, for example, it may also be possible to cool air blown to a front seat of the vehicle interior by the interior evaporator 16 described in the first embodiment and to cool air blown to a rear seat of the vehicle interior by the battery cooling evaporator 20. Thereby, cooling at the rear seat may be achieved as a dual air conditioner using a heat pump. In addition, it may also be possible to cool air blown to a seat other than the front seat such as a second row seat of three row seats, besides the air blown to the rear seat. In addition, the first and second cooling targets may also be air blown to right and left sides of the front seat of the vehicle interior.

The first and second cooling targets may also be devices mounted to the vehicle. The devices exemplify, for example, a secondary battery 53, an internal combustion engine (engine), an electric motor, an inverter, etc.

(6) Although an HFC refrigerant or the like is adopted as the refrigerant and the refrigeration cycle device 10 configures a subcritical refrigeration cycle in each embodiment, carbon dioxide may also be adopted as the refrigerant and the refrigeration cycle device 10 may also configure a supercritical refrigeration cycle in which the pressure in the radiator exceeds a critical pressure of the refrigerant. In this case, in the independent operation mode for battery cooling, the exterior heat exchanger 14 functions as a radiator for radiating heat from the high-pressure refrigerant and the cooling expansion valve 15 is controlled such that the temperature and pressure of the refrigerant flowing out of the exterior heat exchanger 14 are in a predetermine range.

(7) Although the refrigeration cycle device 10 according to the present disclosure is applied to an electric vehicle obtaining driving force for traveling the vehicle from the electric motor for traveling in the first and second embodiments, the refrigeration cycle device 10 may be applied to a hybrid vehicle obtaining driving force for traveling the vehicle from both of the internal combustion engine and the electric motor.

In addition, although the refrigeration cycle device 10 according to the present disclosure is applied to a vehicle in each embodiment, the refrigeration cycle device 10 may also be applied in addition to the vehicle.

Although the present disclosure has been described with respect to the specific embodiments, it will be apparent to those skilled in the art that various changes and modifications may be made without departing from the spirit and scope of the disclosure as defined in the following claims. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigeration cycle device comprising:
a compressor compressing and discharging a refrigerant;
a radiator radiating heat from the refrigerant discharged from the compressor;
first and second pressure reducers connected in parallel downstream of the radiator in a refrigerant flow direction, and decompressing the refrigerant flowing out of the radiator;
a first evaporator cooling a first cooling target and evaporating the refrigerant by heat exchange between the refrigerant decompressed by the first pressure reducer and the first cooling target;
a second evaporator cooling a second cooling target and evaporating the refrigerant by heat exchange between the refrigerant decompressed by the second pressure reducer and the second cooling target;
an accumulator separating gas and liquid of the refrigerant flowing out of the first and second evaporators, and causing a liquid phase refrigerant to be stored in the accumulator and a gas phase refrigerant to flow into the compressor; and
a refrigerant passage through which a portion of the refrigerant flowing out of the radiator flows and is decompressed by a pressure reducer different from the second pressure reducer, so as to return the refrigerant containing a liquid phase refrigerant to the accumulator, in a cooling operation mode for cooling only the second cooling target of the first and second cooling targets, a remainder of the refrigerant passes through the second pressure reducer and the second evaporator in the cooling operation mode,
wherein the second pressure reducer is a mechanical expansion valve, an opening degree of which is adjusted such that a degree of superheat of the refrigerant flowing out of the second evaporator is in a predetermined range, and
wherein the refrigerant passage is a refrigerant passage through which a portion of the refrigerant flowing out of the radiator is introduced into the accumulator via the first pressure reducer that is different from the second pressure reducer and the first evaporator configured so as not to exhibit a cooling function when the blower is stopped.

2. The refrigeration cycle device according to claim 1, wherein:
the first pressure reducer is an electric expansion valve configured to be changeable in an opening degree; and
in the cooling operation mode for cooling only the second cooling target and a cooling operation mode for cooling at least the first cooling target, the opening degree of the first pressure reducer is controlled such that a degree of supercooling of the refrigerant flowing out of the radiator is in a predetermined range.

3. The refrigeration cycle device according to claim 1, further comprising:
a bypass passage through which the refrigerant flowing out of the radiator bypasses the first and second pressure reducers and the first and second evaporators; and
a third pressure reducer provided in the bypass passage, the third pressure reducer being different from the first and second pressure reducers,
wherein the refrigerant passage is configured by at least the bypass passage and the third pressure reducer.

4. The refrigeration cycle device according to claim 1, wherein:
the first cooling target is air blown to a vehicle interior; and
the second cooling target is a device mounted to a vehicle.

5. The refrigeration cycle device according to claim 4, wherein the device mounted to the vehicle is a secondary battery.

6. The refrigeration cycle device according to claim 1, wherein the first and second cooling targets are air to be blown into a vehicle interior.

7. The refrigeration cycle device according to claim 6, wherein air blown to a front seat of the vehicle interior is cooled by the first evaporator, and air blown to a seat other than the front seat of the vehicle interior is cooled by the second evaporator.

8. A refrigeration cycle device comprising:
a compressor compressing and discharging a refrigerant;

a radiator radiating heat from the refrigerant discharged from the compressor;

first and second pressure reducers connected in parallel downstream of the radiator in a refrigerant flow direction, and decompressing the refrigerant flowing out of the radiator;

a first evaporator cooling a first cooling target and evaporating the refrigerant by heat exchange between the refrigerant decompressed by the first pressure reducer and the first cooling target;

a second evaporator cooling a second cooling target and evaporating the refrigerant by heat exchange between the refrigerant decompressed by the second pressure reducer and the second cooling target;

an accumulator separating gas and liquid of the refrigerant flowing out of the first and second evaporators, and causing a liquid phase refrigerant to be stored in the accumulator and a gas phase refrigerant to flow into the compressor;

a refrigerant passage through which a portion of the refrigerant flowing out of the radiator flows and is decompressed by a pressure reducer different from the second pressure reducer, so as to return the refrigerant containing a liquid phase refrigerant to the accumulator, in a cooling operation mode for cooling only the second cooling target of the first and second cooling targets, a remainder of the refrigerant passes through the second pressure reducer and the second evaporator in the cooling operation mode;

a bypass passage through which the refrigerant flowing out of the radiator bypasses the first and second pressure reducers and the first and second evaporators; and a third pressure reducer provided in the bypass passage, the third pressure reducer being different from the first and second pressure reducers, wherein the second pressure reducer is a mechanical expansion valve, an opening degree of which is adjusted such that a degree of superheat of the refrigerant flowing out of the second evaporator is in a predetermined range, and wherein the refrigerant passage is configured by at least the bypass passage and the third pressure reducer.

9. The refrigeration cycle device according to claim 8, wherein the refrigerant passage is a refrigerant passage through which a portion of the refrigerant flowing out of the radiator is introduced into the accumulator via the first pressure reducer that is different from the second pressure reducer and the first evaporator configured so as not to exhibit a cooling function.

10. The refrigeration cycle device according to claim 9, wherein:

the first pressure reducer is an electric expansion valve configured to be changeable in an opening degree; and in the cooling operation mode for cooling only the second cooling target and a cooling operation mode for cooling at least the first cooling target, the opening degree of the first pressure reducer is controlled such that a degree of supercooling of the refrigerant flowing out of the radiator is in a predetermined range.

11. The refrigeration cycle device according to claim 8, wherein:

the first cooling target is air blown to a vehicle interior; and the second cooling target is a device mounted to a vehicle.

12. The refrigeration cycle device according to claim 11, wherein the device mounted to the vehicle is a secondary battery.

13. The refrigeration cycle device according to claim 8, wherein the first and second cooling targets are air to be blown into a vehicle interior.

14. The refrigeration cycle device according to claim 13, wherein air blown to a front seat of the vehicle interior is cooled by the first evaporator, and air blown to a seat other than the front seat of the vehicle interior is cooled by the second evaporator.

* * * * *